March 18, 1952  E. J. FLOETER ET AL  2,589,361
BEET HARVESTER
Filed March 12, 1948  5 Sheets-Sheet 1

INVENTOR.
Edward J. Floeter.
Ervin V. Waack.
BY Frank C. Fearman.
ATTORNEY

March 18, 1952 E. J. FLOETER ET AL 2,589,361
BEET HARVESTER
Filed March 12, 1948 5 Sheets-Sheet 3

INVENTOR.
Edward J. Floeter.
Ervin V. Waack.
By Frank C. Karman.
ATTORNEY

March 18, 1952 E. J. FLOETER ET AL 2,589,361
BEET HARVESTER
Filed March 12, 1948 5 Sheets-Sheet 4

INVENTOR.
Edward J. Floeter.
Ervin V. Waack.
BY Frank C. Fearman.
ATTORNEY

March 18, 1952 E. J. FLOETER ET AL 2,589,361
BEET HARVESTER
Filed March 12, 1948 5 Sheets-Sheet 5

INVENTOR.
Edward J. Floeter
Ervin V. Waack
By Frank C Pearman
ATTORNEY

UNITED STATES PATENT OFFICE 2,589,361

BEET HARVESTER

Edward J. Floeter and Ervin V. Waack, Saginaw, Mich.; Adalene E. Floeter administratrix of said Edward J. Floeter, deceased Application March 12, 1948, Serial No. 14,782

15 Claims. (Cl. 55—106)

The present invention relates to harvesting machines, and in particular to a single or multi-row harvesting machine for soil buried root crops such as beets and other analogous plants.

One object of the invention is to provide a ground traversing harvesting machine which is adapted to unearth root crops and simultaneously exert a pull on the foliage to lift the root and foliage to a location for removal of the foliage and leaf stalks, and the separation of the roots from the leaf stalks and stems at a point slightly below the crown of the root by means of opposed rotary knives or other cutting members.

Another object is to provide a harvesting machine for root crop such as beets and the like in which a plurality of endless conveyors are arranged with adjacent flights in parallel relation to yieldingly and frictionally engage the foliage and leaf stalks of root plants such as beets, to thereby lift or pull said plants and their roots from the soil after the root has been loosened.

Another object is to provide a harvesting machine in which the lifting and pulling conveyors are rockably mounted to swing vertically to facilitate relative adjustment with respect to the soil surface and movement vertically upon striking an obstruction in the harvester pathway.

Another object is to provide a harvesting machine in which a pair of endless conveyor belts are arranged in parallel relation with one of the flight sides of each in adjacent relation, one of which is formed of a link chain and the other being formed of a fibrous V-belt to frictionally and yieldingly engage the root crop foliage during the lifting or removal thereof and while being conveyed to the top removing cutter members.

Another object is to provide a harvesting machine with foliage guiding and directing means on the lower ends of the conveyor frame structure to insure proper positioning of the foliage of the root crop with respect to the mouth of the conveyor members so that the foliage will be tightly and frictionally grasped by said conveyor flights.

Another object is to provide a root crop harvesting machine of the above type in which positioner bars are yieldingly mounted above the rotary top removing cutters to guide the root plants in proper relationship with the rotary cutters so that the root or beet will be cut at a point slightly below the crown to remove the foliage which is disposed of in windrows along the side of the machine, while the beet roots are collected or conveyed to a conventional vehicle (not shown.)

Another object is to provide a harvesting machine for root crops such as beets, in which the plow member for unearthing and loosening the beets is adjustably mounted on the frame to permit vertical adjustment thereof, and positioning of the plow at various depths below the soil surface.

Another object is to provide a harvesting machine for root crops such as beets and the like in which the plant lifting conveyors are yieldably urged into contactual engagement with the beet foliage by yieldingly mounted idler rollers arranged in spaced relation along the active flight of each conveyor element.

Another object is to provide a harvesting machine for root crops such as beets and the like in which the guide means for directing the foliage and leaf stalks of the root plant to the entrance of the lifting conveyors are provided with shear pins to allow the connection between the guides and frames to break when encountering an obstruction, or when the end of the guide drops into a hole or recess.

Another object is to provide a harvester for root crops such as beets and the like, in which the conveyor frames are yieldingly and separably connected at their lower ends to facilitate the removal of earth clouds and the cleaning of the endless conveyor elements when the same become clogged with leaf stalks and other parts of the beet or root crop foliage.

Another object of the invention is to provide a harvesting machine capable of being conveniently connected in draft relationship with a tractor, and to provide a power shaft likewise adapted to be connected to the power take-off coupling of the tractor.

Another object of the invention is to provide a harvesting machine for root crops such as beets and the like, in which the beet body after being severed from the foliage top, is conveyed to a transverse conveyor so as to be collected at one side of the machine in a vehicle, or deposited on the ground for subsequent collection.

Other objects and advantages of the invention will become apparent during the course of the following description of the accompanying drawings wherein:

Figure 2 is a side elevational view of the harvesting machine showing the manner in which

3 the endless lifting conveyors are arranged for yieldingly and frictionally engaging the foliage of beets and the like.

Figure 9 is an enlarged cross-sectional view taken on the oblique line 9—9 of Figure 2, and looking in the direction of the arrows to illustrate the manner in which a beet or other root crop plant is urged downwardly by the guide members during its rearward travel to properly position the root or beet for severance from the foliage at a point adjacent the crown.

Figure 13 is a fragmentary part sectional view showing the wheeled frame and conveyor frames in perspective, and illustrating the manner in which the innermost conveyor frames are adjustably connected to the wheeled frame.

In the drawings, referring more in detail, the harvesting machine comprises a wheeled implement frame generally designated 5 (Figures 1 and 2), formed of longitudinal side frame members 6 of channel section connected at the front and rear by transverse frame bars 7 and 8 respectively, likewise of channel section. The ends of the frame bars 6, 7 and 8 may be welded or

4 otherwise secured together to form a rigid rectangular implement frame. Extending transversely of the frame 5 is a pair of shafts 9 and 10 which are secured to the side frame bar 6 by U-bolts 11. The lowermost bar 10 projects beyond the end of the bar 9 and is provided with an axle portion 12 for supporting a wheel 13 having an inflated tire 14.

Figures 1, 12:
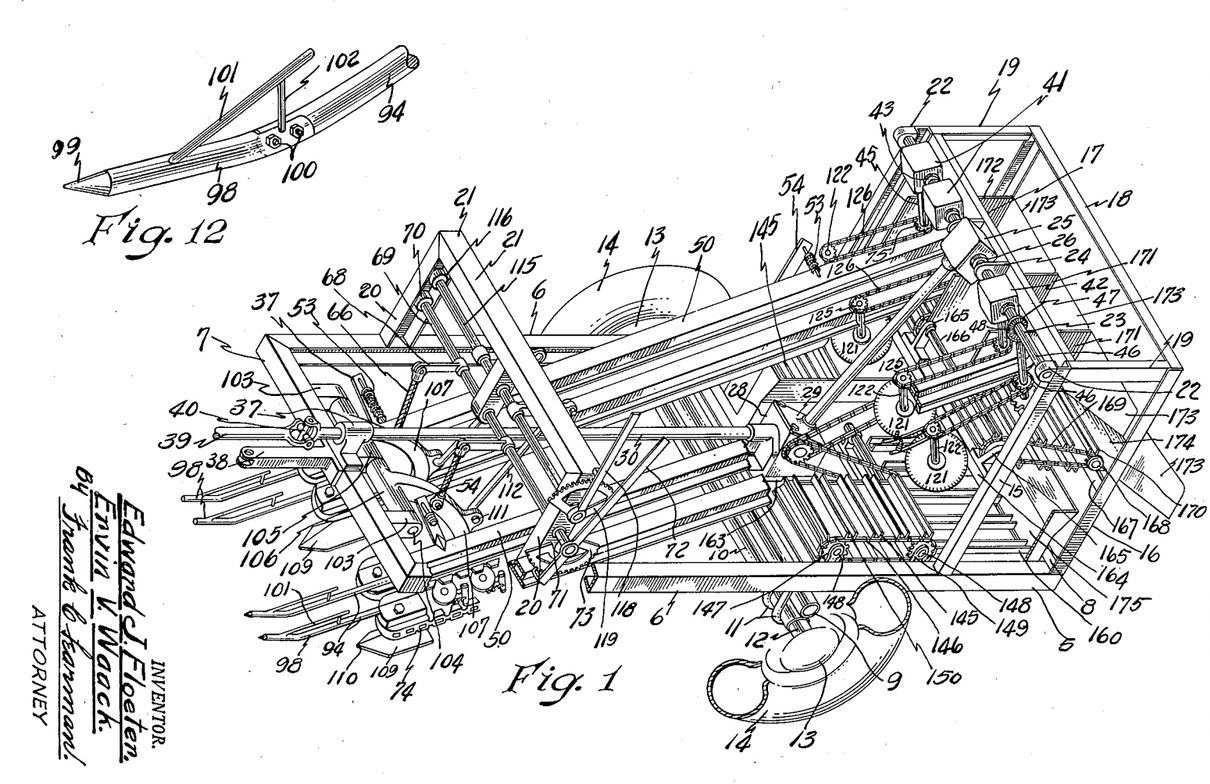
Figure 1 is a perspective view of the harvesting machine of the present invention, showing portions thereof broken away to illustrate various details of construction and the arrangement of certain drive gearing.
Figure 12 is an enlarged perspective view of the foliage guide member, there being two such guides on the lower end of the conveyor frame for guiding the foliage of the root crop such as beets and the like to the mouth or entrance of the coacting endless conveyors.

The rear portion of the wheeled frame 5 is provided on each side with spaced uprights 15 and 16 which are connected at their upper ends by transverse frame bars 17 and 18, (Figure 1). The upper ends of the uprights 15 and 16 are connected one to the other by angle frame bars 19. A similar frame structure is formed on the front end of the wheeled frame 5, and includes a pair of uprights 20 of channel section, having their lower ends welded or otherwise fastened to the side frame bars 6, while their upper ends are connected by means of a transverse bar 21 likewise of channel section.

Figure 8:
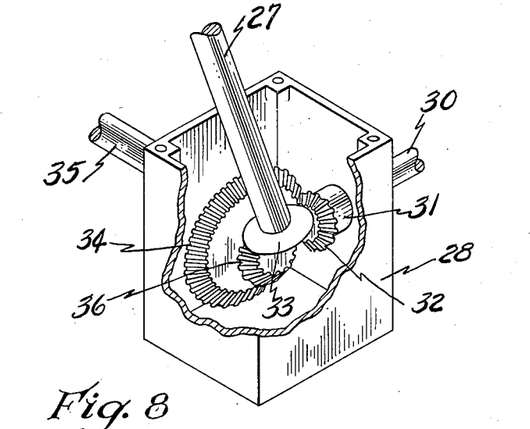
Figure 8 is an enlarged fragmentary perspective view of a gear housing employed for transmitting power from the tractor to the endless conveyor elements and rotary cutting knives.

Mounted on the upper end of each of the uprights 15 is a bearing bracket 22 which is adapted to support the ends of a rotary shaft 23, which is supported intermediate its ends by spaced bearing brackets 24. Mounted on the shaft 23 intermediate the brackets 24 is a gear housing 25 of box-like structure, and collars 26 are secured on said shaft at each side of said housing to prevent axial movement of the gear housing with respect to said shaft. A beveled gear (not shown) is affixed to the shaft 23 within the gear housing 25, and is adapted to mesh with a similar gear (not shown) on the upper end of a shaft 27 which projects into said housing 25 so that the shaft 27 will drive the rotary shaft 23. The lower end of the shaft 27 extends into a gear housing 28 (Figures 1 and 8), and is suitably journaled in a cover plate 29, shown removed in Figure 8. Also projecting into the gear housing 28 is a drive shaft 30 which has affixed to the end thereof the hub 31 of a beveled gear 32 for drivingly engaging a beveled gear 34 affixed to a lateral shaft 35. The lateral shaft 35 projects through one wall of the gear housing 28 and is also fitted with a beveled gear 36 for drivingly engaging a similar gear 33 on the lower end of the shaft 27. The shaft 30 is rotatably supported in a bearing bracket 37 mounted centrally of the front frame member 7, affixed thereto by welding or in any other approved manner. The shaft 35 is adapted to drive suitable conveyor elements which will be hereinafter more fully described.

The wheeled frame 5 is adapted to attach to a tractor in draft relationship therewith by attaching the coupling arm 38 to the tractor coupling (not shown), so that the power take-off shaft extension 39 may be coupled to the shaft 30 by means of a universal joint 40, and thereby drive the shaft 30 and the shaft 23 through the shaft 27 as previously described.

Figures 2, 9, 13:
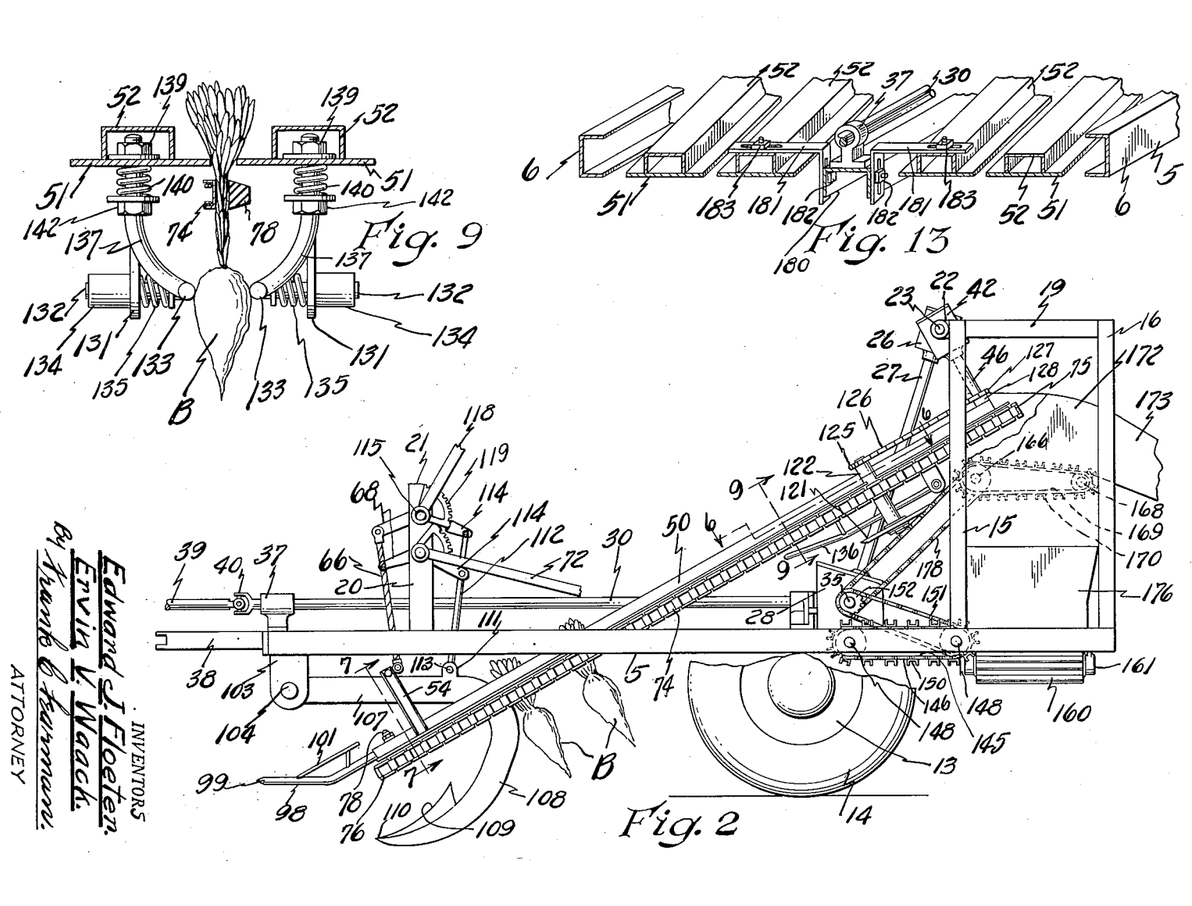
Figure 5:
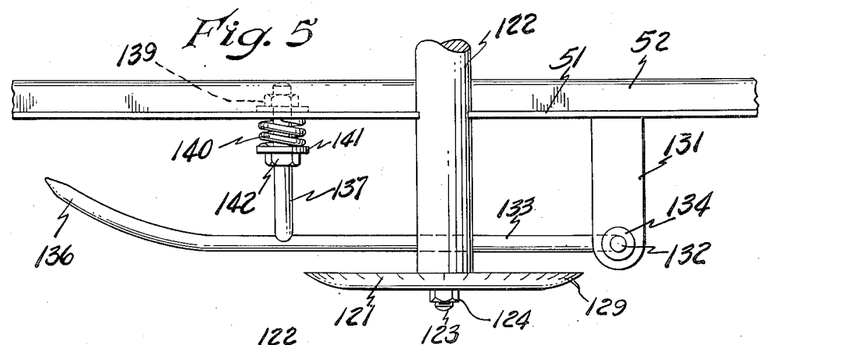
Figure 5 is an enlarged fragmentary side elevational view showing the guide members for positioning the beet or other root crop plant so that the same will be presented to the rotary cutting knife in a proper relation to sever the foliage from the beet at a point adjacent the crown thereof.
Figure 6:
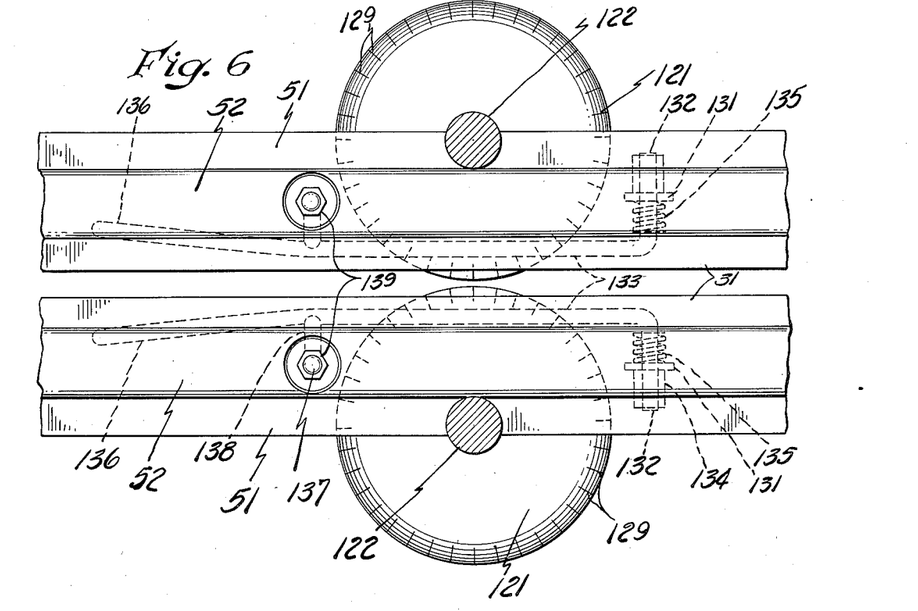
Figure 6 is an enlarged fragmentary sectional view taken on line 6—6 (obliquely) of Figure 2, looking in the direction of the arrows and showing the manner in which the positioner guides are mounted with relation to the rotary cutting knives to properly direct the beets therebetween.
Figure 7:
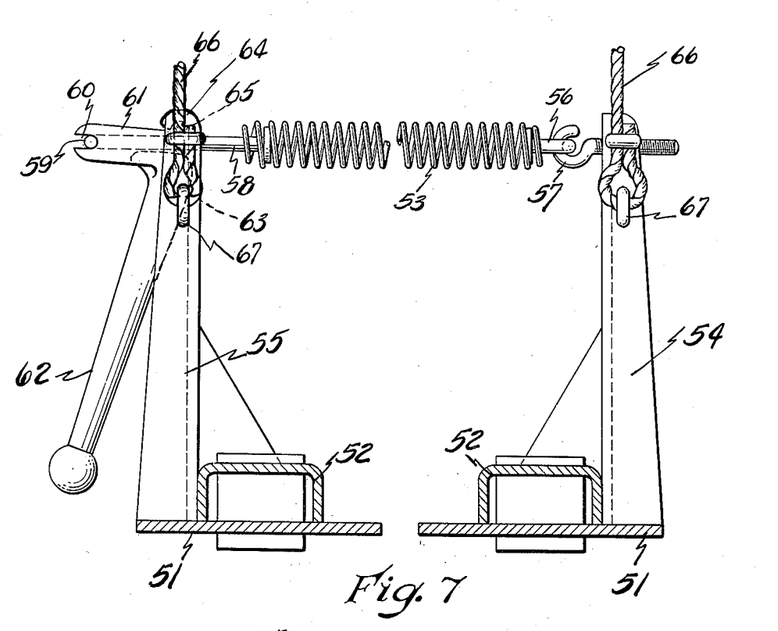
Figure 7 is an enlarged cross-sectional view taken on the oblique line 7—7 of Figure 2, looking in the direction of the arrows showing a set of releasable arms yieldingly connected together to urge the lower ends as well as the upper ends of the conveyor frames in a direction toward one another.

Mounted on the shaft 23 on opposite sides of the gear casing 25 is a pair of similar gear casings 41 and 42, which are held against axial movement by collars 43 and 44 securely mounted on the shaft 23 at each side of the respective gear housings 41 and 42. Journaled in each of the housings 41 and 42 are short shafts 45 and 46 to provide a pair of downwardly extending spaced apart shafts on each side of the gear box 25. The shaft 23 is provided with a series of spaced beveled gears 47 which are adapted to drivingly engage beveled gears 48 on the upper ends of the shafts 46. The lower ends of the shafts 45 and 46 are journaled in suitable bearings provided in the upper ends of spaced conveyor supporting frames generally designated 50. Since each conveyor frame 50 is identical in construction, a description of one will suffice for both, and as shown in Figures 3 to 6 inclusive, each frame comprises a pair of spaced parallel plates arranged in the same plane having secured to the top wall thereof longitudinally extending re-inforcing frame bars 52 of channel section, (Figure 7). The conveyor frame bars 51 and 52 are each supported at their upper ends on each side of the gear housing 25 by the lower ends of the downwardly depending shafts 45 and 46. Thus, the conveyor frame bars 51 and 52 may swing in a lateral direction away from one another with the pairs of shafts 45 and 46 acting as the pivot axis therefore as illustrated in Figures 1 and 2.

The shafts 45 and 46 project through suitable bearings in the frame bars 51 and 52, and are provided on their lower ends with sprocket wheels and pulleys so that each pair of shafts 45 and 46 will be fitted with a sprocket wheel and a pulley having a V-groove. The lower end of each of the shafts 45 and 46 will thus support the upper ends of the endless conveyor frame members 51—52, and the lower ends are adapted to be releasably and yieldingly held together by means of a coil spring 53 which has one end attached to an upright 54 secured to the frame bar 51, and the other end detachably secured to an upright 55 which has its lower end welded or otherwise affixed to the opposed frame bar 51.

One end of the coil spring 53 is provided with a hook 56 which is received in a screw hook 57 adjustably mounted in the upper end of the upright 54. The opposite end is provided with an extension 58 which is adapted to pass through an opening in the upper end of the upright 55, and is bent laterally as at 59 for being received in a notch 60 of a clamping lever arm 61.

The clamping lever arm has an operating handle 62 extending angularly therefrom, and said arm is provided with a seating portion 63 for being received in a correspondingly shaped seat in the upright 55. The upper end of the upright 55 is bent downwardly as at 64 to provide a seat for a projection 65 on the arm 61, so that when the operating lever 62 is swung downwardly to position shown in Fig. 7, the uprights 54 and 55 will be placed under tension and the clamping lever arm 61 will be held against displacement by reason of the fact that the offset end 59 will be in a position off center from the projection 65.

Thus, the lower ends of the conveyor frames 51—52 will be yieldingly urged together, and in order to support said frames at their lower ends, flexible cables 66 are attached to screw eyes 67 provided on the uprights 54 and 55, these cable sections 66 being connected together to form a bridle, the end being connected to a crank arm 68 affixed to a transverse shaft 69 which has its ends journaled in suitable bearings 70 in the frame uprights 20.

One end of the shaft 69 projects through one of the uprights 20 as at 71 for receiving the hub of an operating lever 72, having a latch which is adapted to cooperate with a segment rack 73 to hold the arms 68 in a pre-determined position.

Thus, it will be seen that a pair of downwardly and forwardly inclined spaced apart conveyor frames are supported on each side of the median line of the wheeled frame 5, and one of each pair of conveyor supporting frames 51—52 is adapted to be provided with a link chain conveyor 74 of the endless type which is trained over the sprocket and idler 75 and 76 respectively, located at the upper and lower ends of the conveyor frame respectively. The sprocket wheel 75 is mounted on the lower end of one of each pair of shafts 45 and 46 (Figure 2) to prevent axial movement of the upper end of the corresponding conveyor frame members 51—52.

The other frame structure 51—52 of each pair is provided with pulleys 77 having V-grooves for accommodating an endless V-belt 78. The pulley located at the upper end of each conveyor frame structure is affixed to one of the pairs of drafts 45 and 46, while the V-pulley for the lower end of the endless V-belt 78 is supported on a short shaft 79 held in place by suitable nuts 79 (Figure 3).

Figures 4, 10:
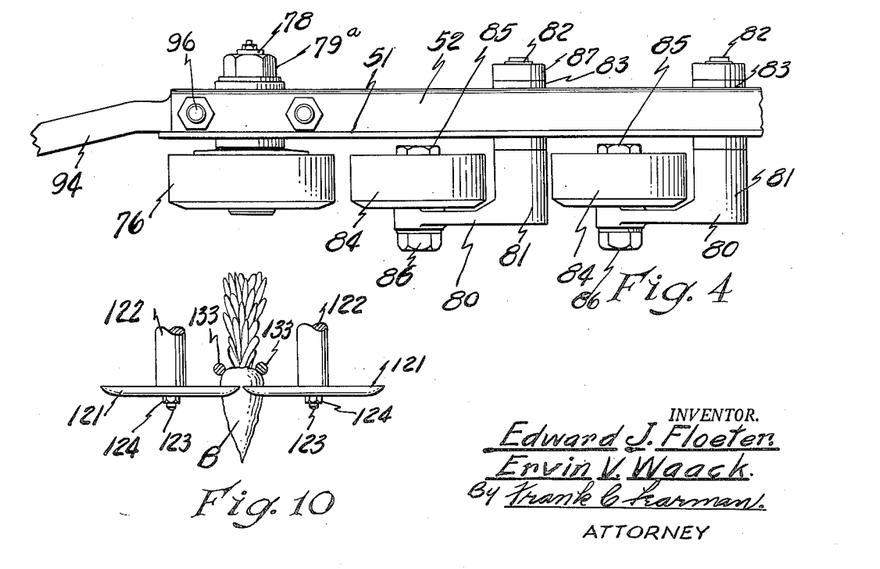
Figure 4 is an enlarged side elevational view of the endless conveyor element supporting frame structure, further showing the manner in which the idle rollers are supported.
Figure 10 is a similar view showing the manner in which the beet or other root crop plant is guided and presented to the cutting knives for severance at a point slightly adjacent the crown.

In order to hold the flights of the co-acting endless conveyor elements 74 and 78 in contactual engagement through the major portion of their travel, one conveyor frame structure 51—52 of each set of co-acting conveyors is provided with a series of rockably mounted arms 80 having collar portions 81 which are affixed to one end of a shaft 82 extending through the conveyor frame members 51—52, and journaled in suitable bearings therein 83. Rotatably mounted on the free ends of the rockably mounted arms 80 are conveyor chain engaging idlers 84 mounted on short shafts or bolts having a headed end 85 and a retaining nut 86 on the opposite end thereof (Figure 4). Secured to the other end of the pin 82 is the collar 87 of an arm 88, which is urged in a clockwise direction by means of a coil spring 89 anchored to one end of the arm 88 as at 90 and to the conveyor frame member 51 at the other end by being received or hooked in a slot 91 extending inwardly from the edge thereof. Thus, the idlers 84 will yieldingly urge the co-active conveyor flight in a lateral direction toward the flexible V-belt of the adjacent endless conveyor.

Figure 3:
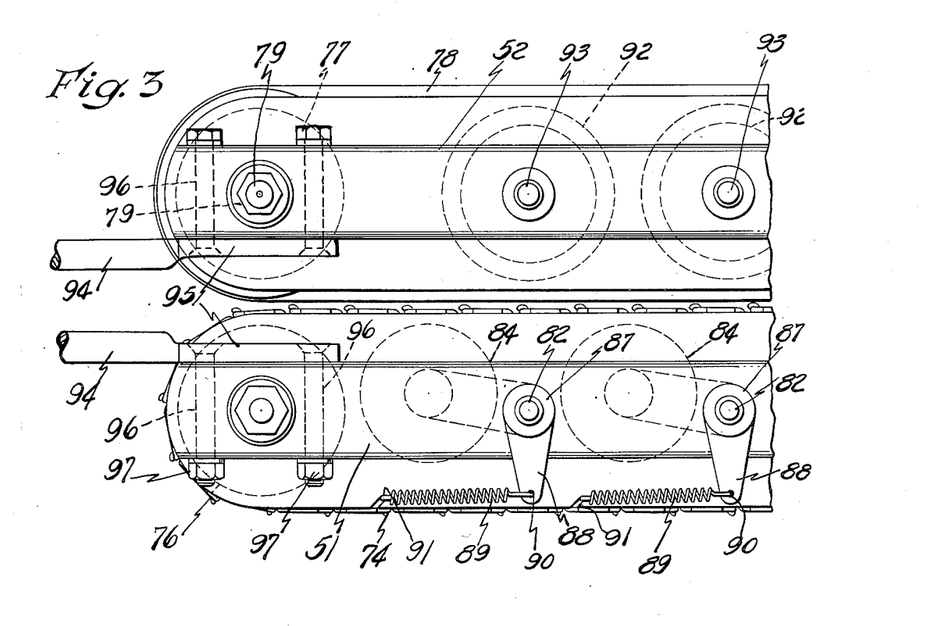
Figure 3 is an enlarged fragmentary plan view of the endless conveyor element supporting frame structure, showing the yieldingly mounted idlers for urging the co-active flights of the endless conveyor elements into contactual engagement one with the other.

Similarly, the endless V-belt 78 is provided with idler rollers 92 which are mounted on fixed shafts 93, and said idler rollers 92 are arranged in staggered relation with respect to the idler rollers 84 (Figure 3).

The lower ends of each endless conveyor supporting frame are provided with foliage guide members, including a bar 94 having a flattened portion 95 which is bolted to the conveyor frame member 51 by suitable bolts 96 held in place by retaining nuts 97. The bolts 96 extend through suitable openings in the side flanges of the channel-shaped conveyor frame bar 52 so as to securely hold the flattened portion 95 of the guide bars 94 to the lower ends of said conveyor frames.

The free end of each guide bar 94 is slightly curved, and is adapted to be attached to a projection 98 having a pointed end 99 to provide a guide finger. Bolts 100 of a relatively soft metal are provided for securing the guide extensions 98 on the guide arm 94 to permit said bolts to be sheared when the guide extension 98 strikes an obstruction or engages within a hole or opening. The guide extension 98 is provided with an upwardly inclined guide bar 101 supported at its upper end by means of a rod 102, which is welded or otherwise held in place.

Mounted on the front frame member 7 is a pair of rearwardly directed bearing brackets 103 for supporting the ends of a transverse shaft 104. The shaft is further supported by means of an intermediate bracket 105, and mounted on the shaft 104 between the bearing brackets 103 and 105 is a pair of sleeves 106 for rockably supporting a lifter arm 107.

The rear end of the lifter arm is curved downwardly as at 108, and provided with a lifter 109 having a point 110. The arms 108 are offset so that the lifters 109 will be positioned at the lower end of each co-acting set of endless conveyor elements. As shown in Figure 2, the pointed end 110 is directly below the lower end of the conveyor frames, and by reason of the lateral offset, the lifter 109 will be positioned to loosen the earth along a plant row prior to the entrance of the foliage of the root crop to the mouth of each set of co-acting conveyor elements.

Thus, the tap roots of the beets are broken and the beet body is partially unearthed so that by the time the foliage of the beet passes between the guide members or extensions 98 for being frictionally engaged by the co-acting sets of endless conveyor elements, the earth about the beet body will be considerably loosened.

The rockably mounted lifter arms 107 are provided with lugs 111 into which is hooked one end of an operating rod 112 as at 113. The upper end of the operating rod 112 of each lifter arm 107 is pivotally connected to an arm 114, which is affixed to a transverse shaft 115 having its ends journaled in suitable bearings 116 in the frame uprights 20 (Figure 1). One end of the shaft 115 is provided with an operating lever 118 which is adapted to be locked in a pre-determined position by means of a latch carried by the lever, and engagable with a sector rack 119 affixed to the frame upright 20.

By manipulation of the control levers 72 and 118 as above described, the lower ends of the co-acting endless conveyor frames and the lifters 109 may be adjusted relative to the earth surface so that the guide members 98 will travel along a plant row in slightly spaced relation thereabove in advance of the lifter 109 adjusted to position the point 110 a suitable depth below the soil surface to unearth the beets and permit the foliage to be grasped by the co-acting sets of endless conveyor elements 74 and 78.

After the beets or other root plant crops are loosened and pulled from the soil, they travel upwardly and are adapted to be engaged by rotary cutting disks 121 positioned on opposite sides of the co-acting endless conveyor elements 74 and 78, and are affixed to the lower ends of shafts 122 which are rotatably mounted in suitable bearings carried by the conveyor frame members 51, these shafts 122 being disposed at a slight angle with relation to a vertical line.

The rotary disk cutters 121 are received on a threaded portion 123 on the lower ends of the shafts 122, and are clamped in place by a retaining nut 124. The upper ends of the shafts 122 have affixed thereto sprocket wheels 125 for receiving sprocket chains 126 which are drivingly connected to a sprocket wheel 127 on the shafts 45 and 46 by having their collars 128 keyed or otherwise secured thereto.

Upon rotation of the shafts 45 and 46, the rotary cutting disks 121 will be driven in opposite directions, since it is intended to arrange the bevel gears 47 and 48 so that the shafts 45 and 46 of each pair will rotate in opposite directions. That is to say, the pair of shafts 45 will rotate in opposite directions, and similarly, the shafts 46 will rotate in opposite directions to impart movement of the co-acting conveyor elements 74 and 78 in a direction so that the cooperative portions of their flights will travel in the same direction. It will be seen that the shafts 122 will likewise rotate in opposite directions.

Figure 11:
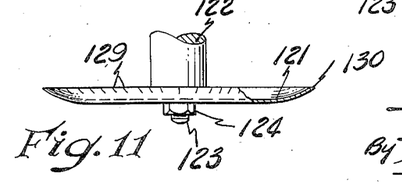
Figure 11 is an enlarged fragmentary edge elevational view of one of the rotary cutting knives showing the manner in which the same is dished, and radially slotted at the cutting edge to facilitate rapid severance of the beet from the foliage.

Each rotary cutting disk 121 is dished as shown in Figure 11, and the peripheral cutting edge is provided with a series of radially extending serrations 129 that serve to draw the beets therebetween and facilitate the cutting operation as the machine is operated. The edges are sharpened to provide a relatively keen cutting edge 130, also shown in Figure 11.

Depending from each conveyor frame plate 51 is an arm 131 (Figures 5 and 6), to which is attached the angled end 132 of a positioner bar 133. The positioner bar 133 has its angled end 132 pivotally mounted in a bearing opening in the lower end of the arm 131, and said angled end is threaded for receiving retaining nuts or the like 134. Encircling the angled extension 132 is a coil spring 135 which has one end in abutting relation with the depending arm 131 and its opposite end in engagement with a washer or the like adjacent the bend of the angled extensions 132. The free ends of the positioner bars 133 are upwardly and outwardly bent as at 136, and are arranged in spaced-apart relation between the conveyor frame plates 51 and the rotary cutting disks 121 (Figures 5 and 6). Extending upwardly from each positioner bar 133 is a projection 137, the end of which is adapted to operate in a slot 138 formed in each of the conveyor frame plates 51, and is held in place by means of a nut 139 threaded on the upper end thereof. A coil spring 140 surrounds each of the extensions 137, and has one end in abutting relation with the underside of the conveyor frame plates 51, and its opposite end in engagement with a washer 141 held in place by a nut 142.

The positioner bars 133 are intended to correctly present the beet or other root crop plant between the rotary cutting disks 121, and if the beets as they pass between the positioner bars are incorrectly positioned, the bars 133 will engage opposite sides of the beet body and draw the same downwardly so that the beet will be severed from the foliage at a point slightly below the crown, as shown in Figure 10. The beet B is illustrated as being severed, while the foliage is frictionally and yieldingly held between the coactive flights of the endless conveyor elements 74 and 78.

When the beet B has been severed the body portion falls downwardly upon an endless conveyor 145 arranged one at each side of the wheeled frame 5. The endless conveyors 145 are provided with side chains 146 which are passed over suitable sprockets 147 carried adjacent the ends of transverse shafts 148 suitably supported at its ends in bearing brackets 149 attached to the side frame members 6. The shafts 148 extend from one side of the frame to the other, so that both endless conveyors 145 may be accommodated on the same shafts. The endless conveyor chains 146 are connected by transverse flights 150, and one of the transverse shafts 148 has keyed thereto a sprocket wheel for receiving a drive chain 151. The drive chain 151 is trained over a double sprocket wheel 152 keyed or otherwise secured to the shaft 35 projecting laterally from the gear box 28.

The endless conveyors 145 are adapted to dump the severed beet bodies upon a similar transverse conveyor 160, which is supported in suitable bearing brackets 161 on shafts and sprockets similar to that described in connection with the endless conveyors 145. One of the supporting shafts of the transverse endless conveyor 160 is provided with a bevel gear (not shown) for being drivingly engaged by a level gear (not shown) on the shaft 148.

A platform 163 suitably supported between the side frame bars 6 on transversely extending bars (not shown), is provided for supporting the gear box 28 and the gear box may be fastened to said platform 163 by screws or other anchoring elements.

Supported between the uprights 15 is a transverse bar 164 having a series of spaced bearing brackets 165 for rotatably supporting a shaft 166. Similarly, a transverse frame bar 167 extends between the frame uprights 16 and is provided with bearing brackets similar to the bearing brackets 165, for rotatably supporting a transverse shaft 168. The shafts 166 and 168 are provided with spaced apart sprocket wheels over which is trained sprocket chains 169 which are connected by transverse conveyor flights 170, thus providing an endless conveyor beneath the extreme upper ends of each pair of co-acting endless conveyor elements 74 and 78 for receiving the foliage and leaf stalks of the beet plants and conveying them rearwardly. Vertical partition plates 171 and 172 are supported between the transverse bars 164 and 167 with the end partition plates 172 being supported by the vertical uprights 15 and 16. The vertical partition plates 171 and 172 are arranged on opposite sides of the conveyors 170, and said partition plates are provided with rearwardly and downwardly extending side wall portions 173, connected at their lower ends by downwardly inclined walls 174. The foliage and leaf stalks will thus be conveyed rearwardly to the discharge chute formed by the downwardly inclined side walls 173 and the connecting bottom wall 174, so as to be discharged on the ground or into a wagon connected to the rear of the wheeled frame 5.

Also supported by the rear frame member 8 beneath the endless conveyors 170, is a transverse vertical wall portion 175 which extends upwardly from one side of the endless conveyor along the rear portion of the frame as shown in Figure 1, and one end is provided with a vertical wall 176 to prevent the beets from being displaced.

The endless conveyors 170 at each side of the wheeled frame are driven by a sprocket chain 178, which has one end trained over one of the sprocket wheels of the double sprocket 152 on the shaft 35 projecting laterally from the gear housing 28. The other end of the sprocket chain 178 is trained over a sprocket wheel mounted on the shaft 166 in alignment with the double sprocket 152.

The upper ends or portions of the conveyor supporting frames 51—52 may be yieldingly urged together in substantially the same manner as the lower ends by providing the frame members with uprights 54 (Figure 1), one being shown having a spring 53 arranged in substantially the same manner as pointed out in connection with the arms 54 and 55 and spring 53 shown in Figure 7.

In Figure 13, there is shown means for supporting the innermost endless conveyor supporting frames 51—52 on the wheeled frame of the harvesting machine, and in order to avoid confusion in Figures 1 and 2, the means is shown separately. The wheeled frame 5 is provided with a central longitudinally extending frame bar 180 which may have its ends connected to the front and rear frame bars 7 and 8 by being welded or otherwise attached thereto. The longitudinal frame bar 180 is of channel section, and has mounted on the web portion thereof a shaft bearing 37 for further supporting the power shaft 30 intermediate its ends.

In order to support the innermost conveyor frames 51—52, a pair of angle brackets 181 are fastened to the side flanges of the longitudinal frame bar 180 by means of a bolt and slot connection 182 to facilitate vertical adjustment of the angle bars. The laterally projecting arms of the angle brackets 181 are connected to the web portions of the innermost conveyor supporting frames 52 by means of a bolt and slot connection 183. Thus, the adjacent endless conveyor supporting frames 51—52 may be adjusted vertically and horizontally, and when the bolt and slot connection 182 and 183 are tightened by a wrench, the innermost conveyor supporting frames 51—52 will be held rigidly to the wheeled frame 5. The structure shown in Figure 13 is intended to mount the innermost conveyor frames 51—52, and by employing the yielding connection shown in Figure 7, at the lower and upper ends of the co-active sets of endless conveyor elements, the frames will be held in a predetermined adjusted position, both conveyor frame structures 51—52 being supported at the lower ends by the flexible bridle cable 66.

In operation, the wheeled frame is connected in draft relationship with a farm tractor or other vehicle (not shown) by connecting the draft tongue 38 to the tractor coupling element (not shown) and similarly connecting the drive shaft extension 39 to the power take-off of the tractor (not shown).

When the tractor and wheeled frame 5 are thus connected, the lifters 109 are positioned at one end of a pair of spaced root plant or beet rows and adjusted to the proper depth so that forward movement of the wheeled frame and lifters 109 will unearth the beets B by breaking the tap roots and slightly elevating the root body of the beet. Simultaneously, the foliage and leaf stalks of the beet will have passed between the guide bars 98 and will enter the mouth of each pair of coacting endless conveyor elements 74 and 78, which are driven at a speed by the shaft 30 and the previously described gearing so that the co-acting portions of the conveyor flights or runs will travel rearwardly at the same speed imparted to the wheeled frame 5. Thus, the wheeled frame 5 is drawn forwardly by the tractor, and the beet plants are conveyed rearwardly and upwardly to the positioner bars 133 so that the root of the beet will be guided between the rotating cutting disks 121 to sever the beet body or root from the foliage or leaf stalks at a point slightly below the crown of the beet body. The beet body then drops or falls, by gravity, upon the endless conveyors 145 at each side of the wheeled frame, and is conveyed rearwardly to the lateral endless conveyor 160 from where it is discharged on the ground in a windrow on one side of the wheeled frame. The foliage and leaf stalks are discharged at the upper ends of the co-acting endless conveyor elements 74 and 78 and are deposited on the longitudinal endless conveyors 170 for being discharged rearwardly of the wheeled frame through the discharge chutes 174.

The co-acting endless conveyors can be adjusted vertically by manipulating the control lever 72 to position the guide bars 98 a pre-determined distance from the plant row surface.

Similarly, the lifter 109 can be adjusted to a proper depth by manipulation of the hand lever 118 which adjusts the pair of lifter supporting arms 107, upon which the lifters 109 are carried. Thus, it is seen that a single control is provided for each set of lifters which simultaneously adjusts said lifters and likewise a single control is provided for the pair of co-acting conveyor elements at each side of the wheeled frame.

The co-acting runs of the conveyors 74 and 76 yieldingly and frictionally engage the foliage or leaf stalks of the beet or other root plant and securely hold the same during their upward and rearward travel, in view of the fact that the idlers 84 and 92 hold the co-acting runs in yielding engagement one with the other.

Since it is common practice to thin root plants such as beets, the plant rows develop in a regular line so as to be easily guided to the mouths of the endless conveyors by the guide rods 98.

It is to be understood that the forms of the invention herewith shown and described are to be taken as preferred embodiments of the invention, and that various changes in the shape, size and arrangement of parts may be resorted to without departing from the spirit of the invention or the scope of the subjoined claims.

What we claim is:

1. In a harvesting machine for root crop plants, a wheeled frame adapted to be connected in draft relationship with a tractor vehicle, lifter means on the forward end of the frame for partially unearthing the roots of said root plants, guide fingers on the frame, a pair of flexible endless conveyor elements operatively associated with said frame for frictionally engaging the foliage of said plants to elevate the same and convey them rearwardly and upwardly, disk shaped driven cutter knives formed with upwardly and outwardly flared rim sections in the conveyor pathway for removing the foliage from said root crop plants, a conveyor for conveying the roots of said crops to one side of the wheeled frame, and means for conveying the foliage rearwardly on said frame, said flexible endless conveyor elements being arranged in a common plane with their adjacent coacting flight runs in mutual contactual engagement.

2. In a harvesting machine for root crops, a wheeled frame adapted to be connected in draft relationship with a tractor vehicle, lifting means on the frame for partially unearthing the roots of said crops, endless conveyor elements supported on said frame adjacent said lifting means for yieldingly and frictionally engaging the foliage of said root plants to lift the same from the earth and convey them rearwardly of the wheeled frame, and disk shaped cutting knives formed with upwardly and outwardly flared rim sections on each side of said conveyor pathway for removing the roots of said plants while the same are suspended from said conveyor means said endless conveyor elements being arranged in a common plane with their adjacent co-acting flight runs in mutual contactual engagement.

3. In a harvesting machine for root crop plants, a wheeled frame adapted to be connected in draft relationship with a tractor vehicle, a lifter on the front end of the wheeled frame for partially unearthing the roots of said plants, yielding and flexible endless conveyor elements rockably mounted on said wheeled frame to swing vertically and laterally, and arranged with one end adjacent said lifter for yieldingly and frictionally engaging the foliage of said root plants to lift the same from the earth and convey them rearwardly of the wheeled frame, and disk shaped cutting elements formed with upwardly and outwardly flared sharpened rim sections on each side of said conveyor pathway for removing the roots of said plants, said yielding and flexible endless conveyor elements being arranged in a common plane with adjacent co-acting flight runs in mutual contactual engagement.

4. In a harvesting machine for root crop plants, a wheeled frame adapted to be connected in draft relationship with a tractor vehicle, a lifter adjustably mounted on the front end of said frame for partially unearthing said plants, a pair of yielding and flexible endless conveyors rockably mounted on said frame with one end arranged above the lifter and extending upwardly and rearwardly therefrom for frictionally and yieldingly engaging the foliage of said plants, disk shaped rotary cutting knives formed with upwardly flared sharpened rim sections on each side of said conveyor pathway adjacent the upper ends of said conveyors for removing the roots of said plants during their rearward conveyor travel, means operatively connected to said frame and endless conveyors for adjusting the endless conveyors vertically and laterally, and idler rollers on said frame and engageable with one of said endless conveyors for yieldingly urging the co-acting flight runs of said conveyors into mutual contactual engagement, said endless conveyors being arranged with their adjacent co-acting flight runs in mutual contactual engagement.

5. In a harvesting machine for root crop plants, a wheeled frame adapted to be connected in draft relationship with a tractor vehicle, a lifter mounted on the forward end of said frame to partially unearth the roots of said plants, a pair of upwardly and rearwardly inclined endless conveyors mounted on said frame with their adjacent co-acting flight runs in mutual contactual engagement to frictionally and yieldingly engage the foliage of said plants at a point above the lifter, a pair of rotary cutting knives formed with rolled, upwardly flared, sharpened rim sections arranged one on each side of said pair of endless conveyors near their discharge ends for removing the roots of said plants during their travel rearwardly, yieldably mounted positioner bars suspended from said frame, the front ends of which are both horizontally and vertically adjustable and means for driving said conveyors and rotary cutting knives.

6. In a harvesting machine for root crop plants, a wheeled frame adapted to be connected in draft relation with a tractor vehicle, a lifter mounted on said frame to partially unearth the roots of said crops in a plant row, a pair of endless conveyor elements inclined upwardly and rearwardly and arranged with their adjacent co-acting flight runs in contactual engagement, the entrance between said conveyor elements being located in spaced relation above said lifter so that the conveyor elements will frictionally grip the foliage of the partially unearthed root crop plants and convey them toward the rear portion of the wheeled frame, means operatively associated with said frame for adjustably supporting said endless conveyor elements, a pair of disk shaped rotary cutting knives formed with upwardly flared rolled rim sections arranged one on each side of the conveyor pathway to sever the roots from said plants as they move rearwardly and upwardly, an endless conveyor for conveying the roots to one side of the wheeled frame, an endless conveyor for conveying the foliage rearwardly of said wheeled frame, and gearing means for driving the conveyor elements, rotary knives and conveying means.

7. In a harvesting machine for root crop plants, a wheeled frame adapted to be connected in draft relationship with a tractor vehicle, a lifter adjustably mounted on the front end of said frame for partially unearthing the roots of said plants, a pair of endless flexible conveyor elements extending upwardly and rearwardly from a location spaced above said lifter with their adjacent co-active flight runs in mutual contactual engagement, yieldingly mounted idlers for urging the flight run of one of said conveyors into yielding engagement with the flight run of the other conveyor, a pair of disk shaped rotary cutting knives having upwardly rolled sharpened rim sections arranged one on each side of the conveyor pathway with their axis parallel and substantially perpendicular to the endless conveyors, a shaft connected to the tractor vehicle for driving the endless conveyors and rotary cutting knives, and levers for adjusting the position of said endless conveyor elements.

8. A harvesting machine for root crop plants, a wheeled frame adapted to be connected in draft relationship with a tractor vehicle, a lifter plow on the front end of said vehicle, a pair of endless conveyor elements supported by said frame in a common plane with adjacent flight runs in mutual contactual engagement and extending upwardly and rearwardly from said plow for engaging the foliage of the plants after they are partially unearthed by said lifter and conveying them rearwardly, a pair of disk shaped rotary cutting knives provided with upwardly and outwardly flared rim sections arranged one on each side of said conveyor pathway for severing the roots of the plants during their upward and rearward travel, and a transversely yieldable positioner bar pivotally mounted on each side of said conveyor pathway and yieldable vertically at a point intermediate its length for correctly positioning the root of said plant and presenting the same to the cutting knives so that the root will be severed at a point slightly below the crown of the root.

9. In a harvesting machine for harvesting beets in spaced plant rows, a wheeled frame adapted to be connected in draft relationship with a tractor vehicle, a pair of lifters mounted on the forward end of said frame for unearthing the beets in said spaced plant rows, a series of flexible endless conveyor elements arranged in pairs with their adjacent flight runs in mutual contactual engagement and extending upwardly and rearwardly from a point above said lifters for frictionally gripping the foliage of said beets and conveying them upwardly and rearwardly, disk shaped cutting knives formed with upwardly rolled sharpened rim sections arranged on each side of said certain pairs of conveyor elements with their cutting edges extending beneath said adjacent flight runs for severing the beets from the foliage during their rearward travel, and means operatively connected to the tractor for driving the conveyor elements and rotary cutting knives.

10. In a harvesting machine for harvesting beets in spaced plant rows, a wheeled frame adapted to be connected in draft relationship with a tractor vehicle, a pair of lifters arranged in spaced relation and adjustably supported on the front of said frame, a pair of endless conveyor elements operatively associated with said frame and extending upwardly and rearwardly from a location above each lifter for frictionally gripping the foliage of the beets and lifting the same when partially unearthed by the lifter, at least one of said conveyor elements of each pair being formed of yieldable material, horizontally disposed outwardly flared positioner bars pivotally connected at their rear ends to said frame and yieldable transversely with relation thereto, disk shaped rotating cutting knives formed with upwardly rolled and sharpened rim sections positioned adjacent the conveyor pathways for severing the beets from the foliage, and means operatively connected to the tractor vehicle for driving the conveyor elements and cutting knives, said pairs of endless conveyor elements being arranged in a common plane with adjacent flight runs of each pair in mutual contactual engagement to yieldingly grip the beet foliage of beets of various dimensions.

11. In a harvesting machine for harvesting beets in spaced plant rows, a wheeled frame adapted to be connected in draft relationship with a tractor vehicle, a pair of lifters arranged in spaced relation on the front of said frame for partially unearthing the beets, a pair of endless conveyor elements arranged in a common plane with adjacent flight runs in mutual contactual engagement inclined upwardly and rearwardly from each lifter for frictionally and yieldingly engaging the foliage of said beet and lifting the same from said plant row, said conveyor elements comprising a continuous V-belt element and a continuous link chain element, guide bars on the lower ends of each pair of endless conveyors for directing the foliage of the beet to the entrance of said endless conveyor elements, and rotary disk shaped cutting knives formed with upwardly rolled flared rim sections arranged adjacent the discharge end and beneath said endless conveyor elements, said cutting knives being positioned with their axis of rotation at each side of the respective conveyor pathways, and means for driving said endless conveyors and cutting knives.

12. In a harvesting machine for harvesting beets in spaced plant rows, a wheeled frame adapted to be connected in draft relationship with a tractor vehicle, a pair of lifters adjustably mounted in spaced relation on the front of said frame, a pair of endless conveyor elements mounted in a common plane and extending upwardly and rearwardly from each lifter with their adjacent co-acting flight runs in mutual contactual engagement for frictionally gripping the foliage of said beets rockably mounted arms on said frame, idlers journaled on the ends of the arms, resilient means for yieldably swinging said idlers into engagement with one of said conveyor elements for urging it laterally toward the companion conveyor element, disk-shaped, rotary cutting knives formed with upwardly flared rolled rim sections mounted beneath the endless conveyor elements and arranged one on each side of the conveyor pathways for severing the beets from the foliage at a point below the crown, and a pair of positioner bars mounted in advance of the rotary cutting knives arranged one on each side of the conveyor pathways for guiding and presenting the beet in proper relation to the rotary cutting knives.

13. In a harvesting machine of the class described, a wheeled frame adapted to be connected to a power vehicle and including means operatively associated with said frame for unearthing the roots of the plants to be harvested, conveyor means on said frame for frictionally engaging the foliage of said plants to elevate and convey them upwardly and rearwardly, said conveyor means comprising a continuous flexible V-belt element and a continuous link chain element, driven cutting means operatively mounted on each side of the conveyor pathway and comprising spaced-apart cutting disks formed with upwardly rolled flared rim sections mounted thereon in pairs, and means for driving said disks, said continuous V-belt and continuous link chain being arranged in side by side relation with their adjacent coacting flight runs in mutual contactual engagement.

14. The combination defined in claim 13 in which the peripheral cutting edge of each cutting disk is formed with a plurality of radially extending serrations.

15. The combination set forth in claim 13 in which the horizontally disposed positioner bars depend from the conveyor frame and are spaced a predetermined distance above the cutting disks, said bars being yieldable from each other to accommodate beets of varying diameters.

EDWARD J. FLOETER.
ERVIN V. WAACK.

REFERENCES CITED

The following references are of record in the file of this patent:

UNITED STATES PATENTS

| Number | Name | Date |
| --- | --- | --- |
| 1,123,897 | Lahti | Jan. 5, 1915 |
| 1,306,673 | Daniels | June 10, 1919 |
| 1,905,194 | Urschel | Apr. 25, 1933 |
| 2,183,631 | Urschel | Dec. 19, 1939 |
| 2,197,225 | Pierson | Apr. 16, 1940 |
| 2,314,681 | Beatty | Mar. 23, 1943 |
| 2,380,193 | Scott | July 10, 1945 |